United States Patent
Amano et al.

[15] 3,662,248
[45] May 9, 1972

[54] TRIGGER CIRCUIT FOR CONTROLLED RECTIFIERS

[72] Inventors: Hisao Amano; Akiteru Ueda; Kenjiro Yokoyama; Fumio Ogata, all of Hitachi, Japan

[73] Assignee: Hitachi Ltd., Chiyoda-ku, Tokyo, Japan

[22] Filed: July 23, 1970

[21] Appl. No.: 57,734

[30] Foreign Application Priority Data

July 25, 1969 Japan..................................44/58342
July 25, 1969 Japan..................................44/58343
Oct. 3, 1969 Japan..................................44/78587

[52] U.S. Cl. ..................321/11, 307/252 Q, 317/10, 321/27 R, 336/73, 336/175
[51] Int. Cl. ..................H02m 7/24, H03k 17/00, H01f 27/28
[58] Field of Search............321/11, 27 R; 307/252 L, 252 Q; 336/73, 175; 317/10, 18 D

[56] References Cited

UNITED STATES PATENTS

3,530,357  9/1970  Leowald..............................321/27 R
3,431,487  3/1969  Savage................................336/73 X
3,424,948  1/1969  Ravas..................................321/11 X Primary Examiner—William H. Beha, Jr.
Attorney—Craig, Antonelli and Hill

[57] ABSTRACT

A trigger circuit for controlled rectifiers connected in series such as a converter in DC transmission systems. A trigger signal for controlled rectifiers is supplied from secondary windings which are disposed on an iron core together with a primary conductor in a current transformer system. Said primary conductor consists of a two-way circuit in which circulates a current for producing a trigger signal. Compensating windings are additionally disposed on said iron core, which combine with said two-way circuit of said primary conductor to prevent an erroneous trigger signal from being generated.

17 Claims, 13 Drawing Figures

TRIGGER CIRCUIT FOR CONTROLLED RECTIFIERS

The present invention relates to an improvement on a trigger circuit for controlled rectifiers connected in series. The converter for use with, say, DC transmission systems, a frequency changer, etc. mainly consists of controlled rectifiers including a mercury arc rectifier or a semiconductor rectifier with controlled electrodes known as a thyristor. This converter is operated as a rectifier or an inverter by controlling the trigger phase of the controlled rectifiers. In order to operate such a converter under a high voltage ranging from a hundred thousand to several hundred thousand volts, said converter has to consist of a considerable number of series-connected controlled rectifiers as a single controlled rectifier which cannot withstand the reverse voltage or the forward voltage during the blocking period. Particularly, thyristors, which have a low breakdown voltage compared to a mercury arc rectifier, have to be connected in series in a greater number, sometime 100-odd to several hundred units.

In providing the controlled rectifiers connected in series as in the above-mentioned converter, one of the most important problems is how to trigger these controlled rectifiers at the same time in response to the correct trigger signal. If the controlled rectifiers are erroneously triggered by an external or internal noise when they should not be, not only is it impossible for the rectifiers to fulfil their original function, but also an excess voltage or an excess current is caused in the component devices, resulting in possible damage thereto. Even though the controlled rectifiers may be triggered in response to a trigger signal, the most important thing is that all of the series-connected controlled rectifiers are triggered simultaneously. If a part of the controlled rectifiers fails to be triggered simultaneously with the other rectifiers despite a trigger signal being supplied, such untriggered controlled rectifiers are impressed with the entire voltage in forward direction, resulting in their possible damage.

To overcome this trouble, various measures have so far been contrived concerning the trigger circuit for supplying a trigger signal to the controlled rectifiers. One of such measures includes a method by which a phototube is employed to supply a luminous pulse as a trigger signal. Another is a device disclosed in British Pat. No. 1,130,925 which delivers a trigger signal utilizing the secondary windings wound on an iron core with a common primary conductor. However, satisfactory results have not necessarily been obtained from the above-mentioned methods in supplying a trigger signal with ample strength and in preventing an erroneous triggering due to noise.

Accordingly, an object of the present invention is to provide a trigger circuit which is able to supply a trigger signal with ample strength simultaneously to controlled rectifiers connected in series.

Another object of the present invention is to provide a trigger circuit which rarely produces an erroneous trigger signal due to noise.

A further object of the present invention is to provide a highly reliable low-cost trigger circuit with a simple configuration.

As will be made clear from the description herein below, in addition to secondary windings to introduce an original trigger signal, the present invention is provided with compensating windings which are arranged in such a manner that the current and magnetic flux for supplying a trigger signals to said two kinds of windings are differentiated from the current and the magnetic flux for producing an erroneous trigger signal, and the above-mentioned two kinds of windings energize each other to supply the correct trigger signal while they de-energize each other to eliminate the cause of an erroneous trigger signal.

The present invention is also characterized in that a trigger signal is supplied by a secondary winding wound around an iron core with a common primary conductor and this primary conductor consists of a two-way circuit with two iron cores disposed at each way thereof, whereby the currents for supplying the correct trigger signal flow in the opposite directions through said two-way circuit while the currents for producing an erroneous trigger signal due to a noise flow in same direction through the two-way circuit. Observing this fact, the generation of an erroneous trigger signal is prevented by distinguishing it from a right trigger signal through the utilization of the above-mentioned manners of current flow.

The present invention is further characterized in that an erroneous trigger signal caused on said iron core by a magnetic flux of an external magnetic field is identified in accordance with the manner in which the magnetic flux acts upon the iron core, thus preventing an erroneous trigger signal.

Other objects, features and advantages of the present invention will be made readily apparent from the following descriptions taken in conjunction with the accompanying drawings, in which.

Figure 1:
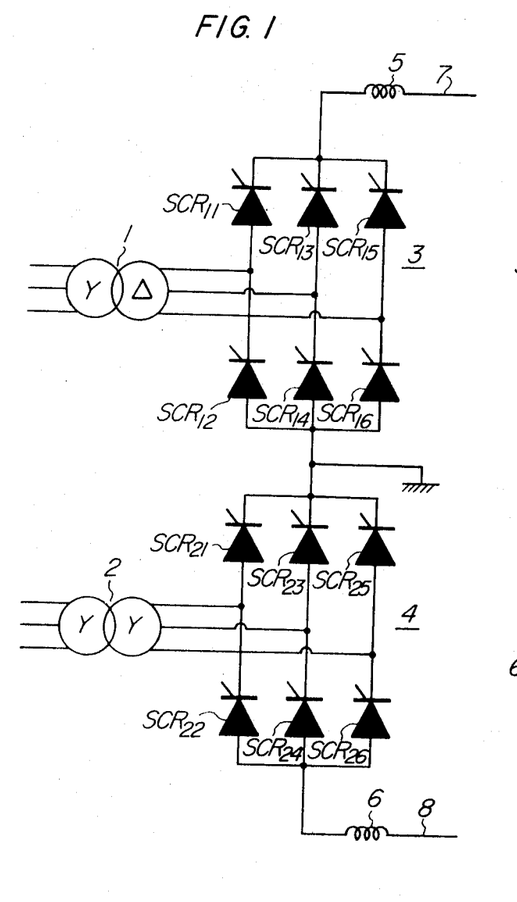
FIG. 1 is a circuit diagram showing the construction of a typical DC transmitting system making up a terminal station.

Referring to FIG. 1, numerals 1 and 2 identify transformers and the symbols $SCR_{11}$, $SCR_{12}$, ....., $SCR_{16}$ and $SCR_{21}$, $SCR_{22}$, ..... $SCR_{26}$ show arms constituting the converters 3 and 4 respectively. Each arm comprises a plurality of series-connected controlled rectifiers or, if current capacity poses a problem, a required number of parallel-connected controlled rectifiers. The numerals 5 and 6 are DC reactors and 7 and 8 DC power lines. The converters 3 and 4 are energized respectively through the transformers 1 and 2 by an AC power system (not-shown). The converters 3 and 4 are connected with each other at one terminal thereof and grounded, the other terminals thereof being connected via the reactors 5 and 6 respectively to the DC power lines 7 and 8. In a typical d-c power transmission system as shown in the drawing, each arm is so controlled as to be triggered in a predetermined phase relationship and the converters 3 and 4 are operated as a rectifier or a invertor. Each controlled rectifier making up an arm has to be triggered not only with a correct trigger signal but also simultaneously so that the converters may fully display their functions. Explanation now will be made of an embodiment in which the present invention is applied to a trigger circuit of a converter.

Figure 2:
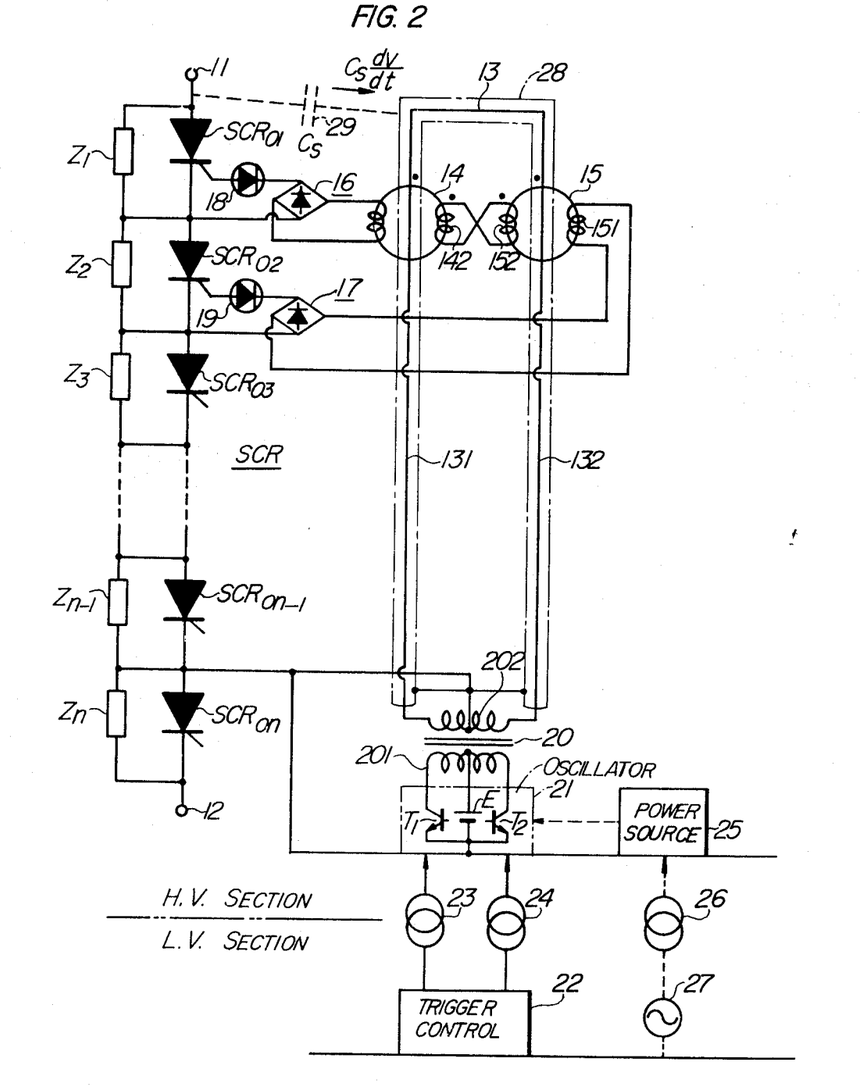
FIG. 2 is a schematic drawing illustrating an embodiment of the present invention.
Figure 8:
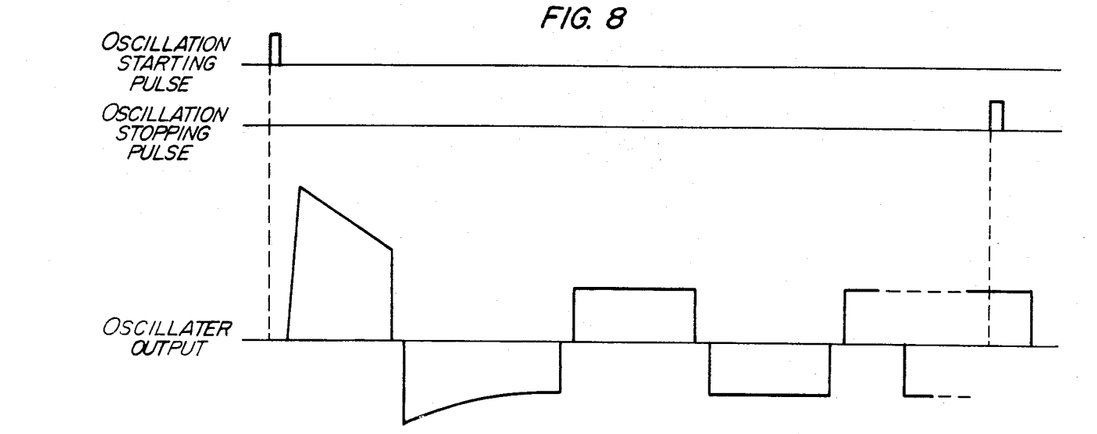
FIG. 8 is a graph showing an example of the waveform of the output of an oscillating circuit which is utilized as a trigger signal.

A schematic diagram of an embodiment of the present invention is shown in FIG. 2, where the series circuit of controlled rectifiers shown by SCR corresponds to, say, the arm $SCR_{11}$ in FIG. 1, the terminals 11 and 12 thereof being respectively connected to the transformer 1 and the DC reactor 5. The symbols $Z_1, Z_2 ..... Z_n$ show the impedance for voltage division and damping, and they are respectively connected in parallel with the controlled rectifiers $SCR_{01}$, $SCR_{02}$, ..... $SCR_{on}$ making up the arm SCR. The numeral 13 indicates the primary conductor for supplying a trigger signal, which in the embodiment shown in the drawing consists of two-way conductor portions 131 and 132. The numerals 14 and 15 show iron cores, through the centers of which the primary conductor portions 131 and 132 are disposed respectively. The numerals 141 and 151 are secondary windings wound around the iron cores 14 and 15 respectively, and 142 and 152 are compensating windings additionally wound around the iron cores 14 and 15 respectively. The secondary windings 14 and 15 are connected with the full-wave rectifier circuits 16 and 17 respectively the output of which is applied to the gates of the controlled rectifiers $SCR_{01}$ and $SCR_{02}$ respectively through, say, the zener diodes 18 and 19. The numeral 20 shows a matching transformer, the two terminals of whose secondary winding 202 are connected to the terminals of the primary conductor portions 131 and 132 respectively. The primary winding 201 of the matching transformer 20 is energized by the output of the oscillating circuit 21 which is represented by the power supply E and the switching transistors $T_1$ and $T_2$. This oscillating circuit begins to oscillate according to an oscillation-starting pulse supplied by the trigger control device 22 via the insulating pulse transformer 23 and stops oscillating with an oscillation-stopping pulse supplied through the insulating pulse transformer 24. The output of the oscillating circuit is of course utilized as a trigger signal for the controlled rectifiers. The waveform of the above-mentioned output is shown in FIG. 8. The example as shown in this drawing is so arranged that a large current flows immediately after the oscillation-starting pulse is applied and the oscillation stops after the oscillation-stopping pulse is applied. This example in which a trigger signal has a big amplitude at the rise portion is advantageous in that an ample gate power is supplied to eliminate the imbalance of the triggering time among the controlled rectifiers. The numeral 25 shows a power source circuit which is energized by the auxiliary power supply 27 via the insulating transformer 26. The power supply E of the oscillating circuit 21 derives from the circuit 25. The numeral 28 shows an electrostatically shielded conductor, which is connected in order to prevent an induced current, or a source of an erroneous trigger signal, from directly flowing into the primary conductor 13. A gate circuit is made up of mainly the oscillating circuit 21, matching transformer 20, primary conductor 13, iron cores 14 and 15 and the secondary windings 141 and 151. To prevent unnecessary fluctuations of the potential of said gate circuit, it is recommended that a center tap of the secondary winding 202 of the matching transformer, the shield conductor and the oscillating circuit 21 should be interconnected so as to maintain the same potential at these points, as shown in the drawing, and the resultant circuit be connected to a point of the main converter circuit, say, the anode of the controlled rectifier $SCR_{on}$. Although not shown, it is needless to say that the other controlled rectifiers are supplied with a trigger signal in a similar way to the $SCR_{01}$ and $SCR_{02}$.

Now, the operation of the above-mentioned trigger circuit will be described below. Assume that the compensating windings 142 and 152 shown in the drawing are not wound around the iron cores 14 and 15. When an oscillation-starting pulse is supplied from the trigger control device 22 at a predetermined timing, the oscillating circuit 21 begins to oscillate accordingly, resulting in a current flow through the primary conductor 13 as shown in FIG. 8. As a consequence, voltages are induced in the secondary windings 141 and 151 wound around the iron cores 14 and 15, which voltages are rectified by the rectifying circuits 16 and 17 and applied to the gates of the controlled rectifiers $SCR_{01}$ and $SCR_{02}$ through the zener diodes 18 and 19. It follows therefore that all the controlled rectifiers making up a series circuit are simultaneously supplied with a trigger signal with ample strength.

As can be seen from the above description, said trigger circuit is suitable so far as a signal with ample strength is supplied at the same time. But since a trigger signal is produced by the mere fact that a current flows in the primary conductor, a problem is posed that an erroneous trigger signal is easily produced. For example, due to a stray capacity $C_s$ existing between the main circuit of the cnverter and the primary conductor(or the shield conductor), as represented by the numeral 29 in the drawing, a fluctuation in voltage between the main circuit of the converter and the primary conductor results from any of the various causes including a fluctuation in voltage in the AC system, a system failure such as grounding or short circuit, commutation in the other arms of the converter, or a failure of the DC power line. Then, a current in the amount of $C_s dv/dt$ flows through the primary conductor (or the shield conductor in the embodiment shown in the drawing) depending on the fluctuation rate $dv/dt$. Therefore, voltages are also induced in the secondary windings 141 and 151 by dint of the current supplied through the stray capacity 29, which voltages function as an erroneous trigger signal for the controlled rectifiers. It is necessary, therefore, to contrive some measure to block such an erroneous trigger signal.

For this purpose, the present invention is intended to stop such an erroneous trigger signal with an eye on the phenomenon that the current in the primary conductor for supplying the correct trigger signal flows in a different manner from the current in the primary conductor in the form of a noise caused by, say, the stray capacity 29. That is to say, the currents which give rise to a correct trigger signal circulate in the primary conductor, i.e., flow in opposite directions through the conductor portions 131 and 132, while the currents due to the stray capacity 29 are divided by the conductor portions 131 and 132 and flow through them in the same direction.

Taking this fact into consideration, the generation of an erroneous trigger signal can be prevented in the following way: The iron cores 14 and 15 have such a polarity that a voltage is induced in the compensating windings 142 and 152 in the directions shown by dots when a current flows, say, in the directions shown by dots in the primary conductor portions 131 and 132. In addition, an arrangement is made in such a manner that not only the same voltage is induced by the same primary current flowing in the primary conductor, but also the compensating windings are cross-connected with each other to offset the voltages generated therein when the primary currents flow in the same direction.

In the foregoing arrangement of the compensating windings 142 and 152, the current from the matching transformer 20 for supplying a trigger signal flows in opposite directions in the primary conductor portions 131 and 132 and hence voltages in opposite directions are induced in the compensating windings 142 and 152, resulting in no current flow being caused by such voltages. On the other hand, the current due to the stray capacity induces voltages in the same direction in the compensating windings 142 and 152 with the result that the current thus caused flows around the compensating windings 142 and 152. This means that the currents flowing in opposite directions in the primary conductor for supplying a trigger signal are not affected by the compensating windings at all, while, against the currents in the same direction for supplying an erroneous trigger signal, the compensating windings function just like a circuit possessing very low impedance in shunt with the secondary windings 141 and 151. Consequently, an erroneous trigger signal is substantially short-circuited, thereby, preventing erroneous triggering of the controlled rectifiers.

The function of the compensating windings described with reference to FIG. 2 is equivalently explained in FIG. 3, in which the portion related to the iron core 14 is shown by the numeral 31 which is a circuit representative of the primary conductor 131, by the numeral 32 which is an impedance representative of a parallel circuit consisting of an exciting impedance for the secondary windings 141, a resistor in the gate circuit for the controlled rectifiers and an exciting impedance for the controlled rectifiers and an exciting impedance for the compensating windings 142, and by the numeral 33 which is a contact representative of the effect of the compensating windings. When a current flows through the circuit 31, no current flows through the impedance 32 if the contact 33 is closed, and therefore the current is by passed through the contact 33, in which case the current does not function as a trigger signal. On the other hand, if the contact 33 is opened, a trigger signal is naturally obtained. In other words, it depends upon whether the contact 33 is closed or opened that the current flows or does not flow in the compensating windings. This selection is automatically accomplished by the manner of current flow in the primary conductor.

If the contact 33 is to be closed by the current flowing around the compensating windings 142 and 152, the current flows in the two primary conductor portions have to be not only in the same direction, but must also have the same magnitude. If they are different from each other in magnitude, the contact 33 is not completely closed, as when some impedance is connected. Therefore, even if the current for supplying a correct trigger signal is superposed on a bigger current due to the stray capacity 29, resulting in a current flow in the same direction through the primary conductor, the difference in current magnitude by the amount of a correct trigger signal does not necessary make it impossible to obtain a correct trigger signal because of the compensating windings.

Figure 3:
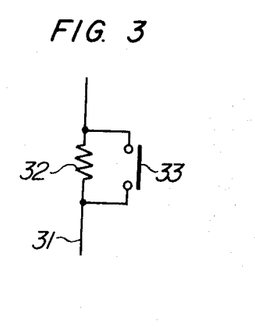
FIG. 3 shows an equivalent circuit diagram for explaining the embodiment illustrated in FIG. 2.
Figure 4:
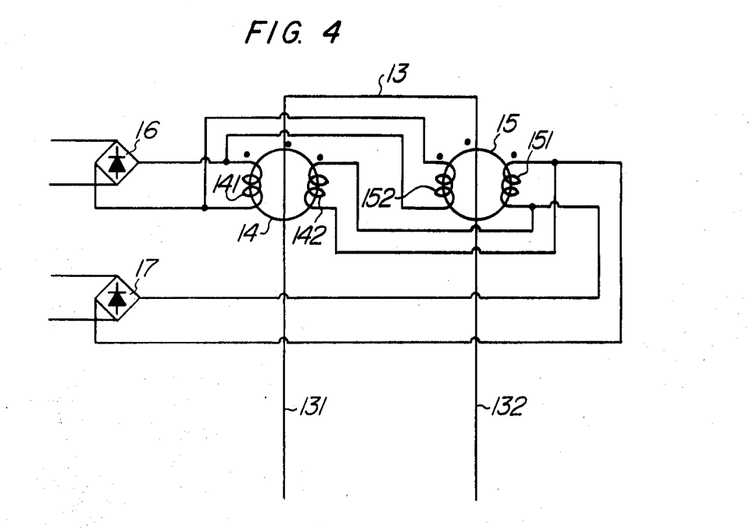
FIG. 4 is a schematic drawing showing the essence of another embodiment of the present invention which is based on the same principle as that of said first embodiment.

As will be clear from the equivalent circuit shown in FIG. 3, the same performance as the circuit shown in FIG. 2 is obtainable by the connection shown in FIG. 4 which illustrates mainly the compensating windings in the trigger circuit of FIG. 2, with similar symbols indicating similar components.

In the embodiment shown in FIG. 4, the secondary windings 141 and 151 are arranged in such a manner that, as illustrated in dots, said windings have the same polarity as the compensating windings 142 and 152 and the same voltage is induced as in said compensating windings by the same current. The secondary winding 141 and the compensating winding 152 are cross-connected with each other at their respective terminals with different polarities. The secondary winding 151 and the compensating winding 142 are also cross-connected with each other. In such connections, when a current for supplying a correct trigger signal flows through the primary conductor portions 131 and 132, voltages opposite to each other in porality are induced in the secondary winding 141 and the compensating winding 152. Because of the cross-connection of the windings 141 and 152, the above-mentioned opposite voltages are applied in parallel through the rectifying circuit 16 to the gates of the controlled rectifiers. This holds true for the windings 151 and 142. Turning now to the current due to the stray capacity 29, it flows in the same direction through the primary conductor portions 131 and 132, whereby the voltages induced by the windings 141 and 152 are identical to each other in polarity. Both of said windings are cross-connected with each other and so the current due to said voltages only circulates in the windings, without being supplied to the gate electrodes of the controlled rectifiers through the rectifying circuit 16. This is also the case with the windings 151 and 142. That is to say, the example shown in FIG. 4 is equivalent to the circuit shown in FIG. 3 where the contact 33 is opened or closed depending on the manner of current flow in the primary conductor. There is no substantial difference between the embodiment shown in FIG. 2 and that shown in FIG. 4 except that in the former embodiment the manner of the current flow in the primary conductor is discriminated only by the relationship between the compensating windings 142 and 152, while in the latter embodiment a compensating winding wound on the mating iron core is directly utilized.

Figure 5:
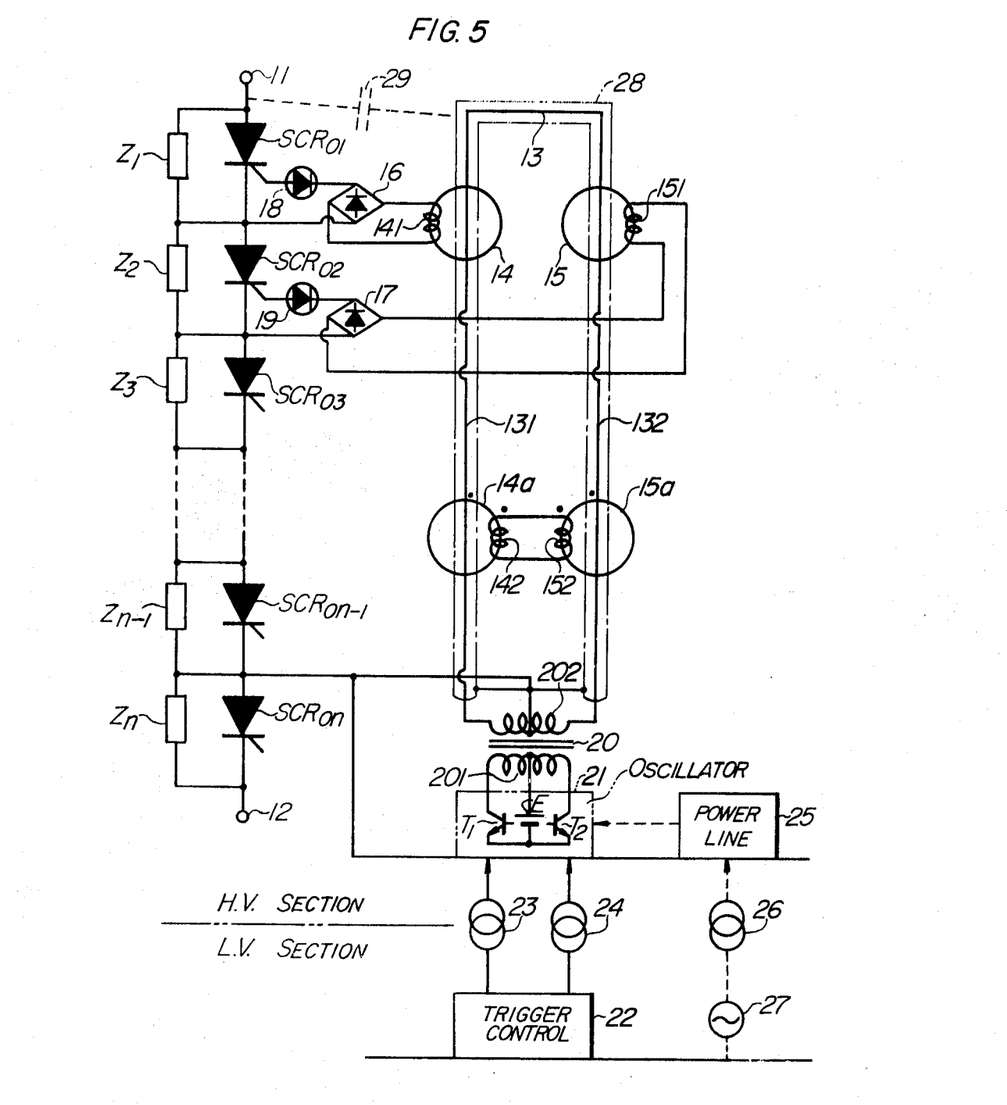
FIG. 5 is a schematic drawing showing a third embodiment with another configuration according to the present invention.

A third embodiment of the present invention is shown in FIG. 5, in which similar symbols are given to similar or equivalent components as indicated in FIG. 2. Making a comparison between FIG. 2 and FIG. 5, it is clear that in the embodiment shown in FIG. 5 the compensating windings 142 and 152 are disposed not on the iron cores 14 and 15 but on separate auxiliary iron cores 14a and 15a newly added, the rest remaining the same as the embodiment in FIG. 2. The compensating windings around the iron cores 14a and 15a, as in the case of the embodiment in FIG. 2, are connected in parallel with each other at their respective terminals with the same polarities as shown by the dots. Accordingly, the auxiliary iron cores 14a and 15a together with the compensating windings 142 and 152 wound therearound function as follows: The current, if any, for supplying a correct trigger signal flows in the opposite directions through the primary conductors 131 and 132, resulting in voltages of opposite polarities being induced in the compensating windings 142 and 152. Because the compensating windings are connected in parallel with each other as shown in the drawing, a current caused by the voltages of opposite polarities circulates in the compensating windings, which means that the existence of the iron cores 14a and 15a and the compensating windings 142 and 152 does not affect the primary conductor at all. The currents flowing through the primary conductor portions 131 and 132 due to the stray capacity 29 flow in the same direction, which give rise to voltages of the same polarity in the compensating windings 142 and 152, with the result that the above-mentioned voltages are opposite to each other, causing no current to flow in said compensating windings 142 and 152. This is equivalent to a primary conductor circuit with a large impedance connected in series therewith, thereby substantially blocking the current flow in the primary conductor. It follows therefore that a trigger signal is obtained in the secondary windings 141 and 151 only in response to the right current for supplying a correct trigger signal.

Figure 6:
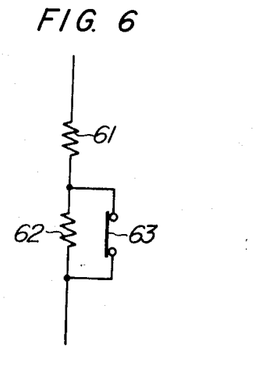
FIG. 6 is an equivalent circuit diagram illustrating the embodiment shown in FIG. 5.

FIG. 6 shows an equivalent circuit for explaining the function of the compensating windings in FIG. 5. The numeral 61 shows an impedance representing the secondary winding 141 and the gate circuit connected therewith. The numeral 62 represents the auxiliary iron cores and the compensating windings disposed thereon, which has an impedance in such a state that the current flow if blocked in the compensating windings. The numeral 63 shows a contact for explaining the effect of the compensating windings. As described earlier, for the correct trigger currents in opposite directions, the circuit is equivalent to a state where there are no auxiliary iron cores 14a and 15a nor the compensating windings 142 and 152, namely the state where the contact 63 is closed. For the currents in the same direction due to the stray capacity 29, by contrast, the circuit is equivalent to a state where the contact 63 is opened.

When comparing FIG. 3 with FIG. 6, it is clear that the compensating windings in the embodiment shown in FIG. 2 and those in the embodiment shown in FIG. 4 function in opposite ways to each other. In other words, in the embodiment of FIG. 2, a contact which is connected in parallel with the secondary windings is opened by the current for supplying correct trigger signal, whereas in the embodiment shown in FIG. 4 a contact which is connected in series with the secondary windings is closed by the correct current for supplying a correct trigger signal.

Figure 7:
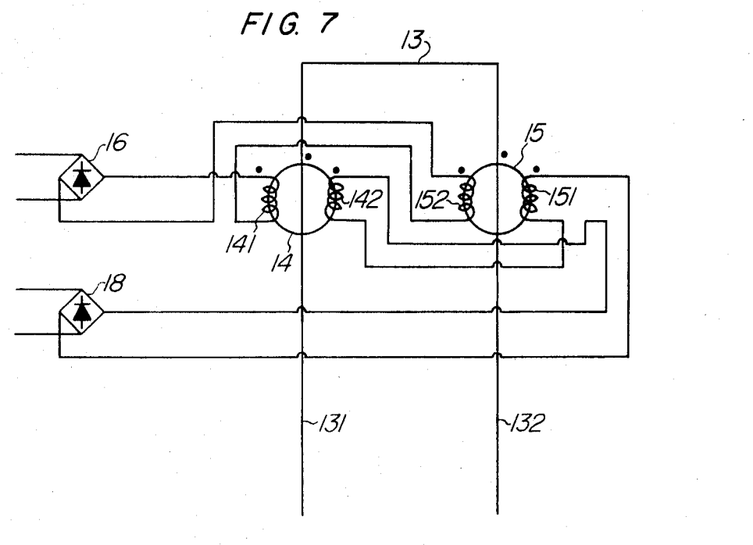
FIG. 7 is a schematic diagram showing the essence of a fourth embodiment on the same principle as the embodiment shown in FIG. 5.

As will be evident from the equivalent circuit shown in FIG. 6, the same function as obtained from the circuit shown in FIG. 5 can be achieved by the connection shown in FIG. 7 which mainly illustrates the compensating windings in the trigger circuit of FIG. 5. In FIG. 7, similar components are marked with similar symbols and, unlike the circuit of FIG. 5, no auxiliary iron core is used, but the compensating windings 142 and 152 are directly disposed on the iron cores 14 and 15.

Referring to the embodiment shown in FIG. 7, the primary conductor, the secondary windings and the compensating windings are arranged in such a manner as to have the same polarity and produce the same voltage for the same primary current. One end of the secondary windings is connected with one end with the same polarity of the compensating windings disposed on another iron core, and the other terminals of the same polarity of the series-connected winding group are connected to the rectifying circuit respectively. As a consequence, when the currents flowing in the primary conductors 131 and 132 are in opposite directions, the sum of the voltages induced in the windings is applied to the rectifying circuit. On the other hand, when the currents flow in the same direction, the voltages induced in the windings are offset with each other, thereby applying no voltage to the rectifying circuit. Hence only the correct trigger signal is supplied to the gate of the rectifying circuit.

Figure 9:
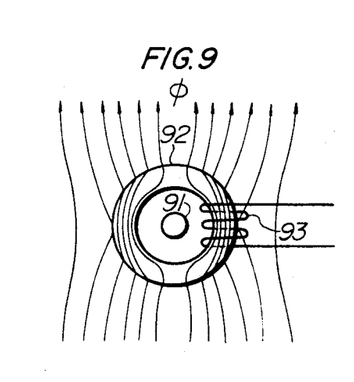
FIG. 9 is a drawing which, unlike the foregoing drawings, is for explaining the cause of an erroneous trigger signal due to an external magnetic field.

FIG. 9 is a drawing for explaining the cause of an erroneous trigger signal being generated by an external magnetic field apart from a similar signal due to the stray capacity. The numeral 91 represents the primary conductor portions previously shown by 131 and 132, the numeral 92 the iron cores previously shown by 14 and 15 and the numeral 93 the secondary windings previously shown by 141 and 151. The symbol $\phi$ shows a magnetic flux caused by an external magnetic field existing where the iron core 92 is located, which magnetic flux is produced by, say, the current flowing through the main converter circuit. When the external magnetic field acts on the iron core 92, the magnetic flux due to said external magnetic field induces a voltage in the secondary winding 93. Therefore, it is likely that said voltage erroneously functions as a trigger signal for the controlled rectifiers in the same way as the current flowing through the primary conductor 91.

Generation of this erroneous trigger signal can be prevented in the manner mentioned below. It is obvious that the direction of a magnetic flux existing at an iron core portion inside the secondary winding 93 is reverse to that of a magnetic flux existing in an iron core portion just opposite with respect to the primary conductor, since the magnetic flux caused in the iron core 92 by the current flowing in the primary conductor 91 circulates in the iron core. On the other hand, the magnetic flux $\phi$ due to the external magnetic field acts on the iron core in the same direction as shown in the drawing.

Figure 10:
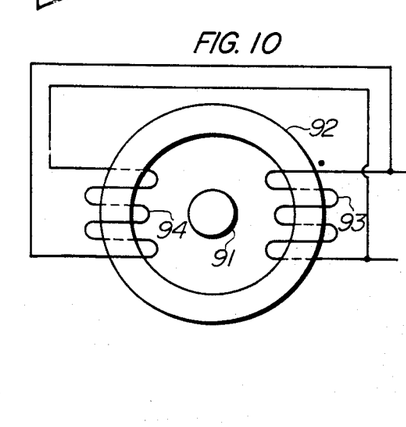
FIGS. 10 and 11 are circuit diagrams showing different embodiments for preventing an erroneous trigger signal caused as shown in FIG. 9.
Figure 11:
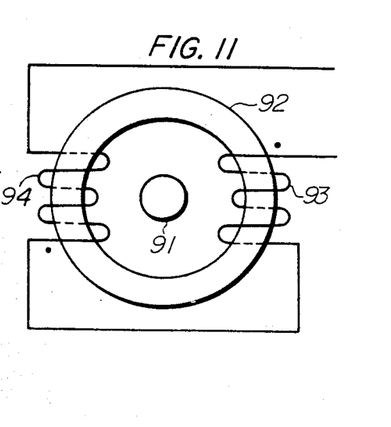

The relationship between the magnetic flux due to the current flowing through the primary conductor and the magnetic flux caused by the external magnetic field is the same as the relationship between the current in the primary conductor for supplying a correct trigger signal and the current in the primary conductor due to the stray capacity 29. The compensating winding is therefore disposed at the iron core portion just opposite the secondary winding 93 with respect to the primary conductor 91. Assume that a voltage with the polarity shown in dots is generated in the iron core 92 as a magnetic flux is produced by the current flowing through the primary conductor 91. Then the secondary winding 93 and the compensating winding 94 are connected in parallel at their respective terminals with the same polarities as shown in FIG. 10. As an alternative as shown in FIG. 11, the two windings may be connected in series at their respective terminals with different polarities, the other terminals being used as output terminals. In these arrangements, the embodiments in FIG. 10 and FIG. 11 function in the same way as the embodiments in FIG. 4 and FIG. 7 respectively, thereby preventing the generation of an erroneous trigger signal due to the external magnetic field. In the embodiment shown in FIG. 10, the voltages induced in the windings 93 and 94 by the current flowing in the primary conductor 91 are applied in parallel to the gate electrodes of the controlled rectifiers (not shown), while the voltage induced by the external magnetic field induces a current which merely circulates in the windings 93 and 94 without being applied to said gate electrodes. Referring to the embodiment shown in FIG. 11, the sum of the voltages induced in the windings 93 and 94 by the current flowing in the primary conductor 91 is applied to the gate electrodes, while the voltages in opposite directions induced by the external magnetic field are offset by each other and so no trigger signal is applied to the gate electrodes.

If the external magnetic field described with reference to FIG. 9 is not very strong, it is possible that any erroneous trigger signal caused by such external magnetic field be prevented by the zener diodes 18 and 19 (see FIG. 2) from being applied to the gate electrodes. In addition, since such a signal is small in comparison with an erroneous trigger signal due to the stray capacity 29, there may be no need for the compensating winding 94.

Figure 12:
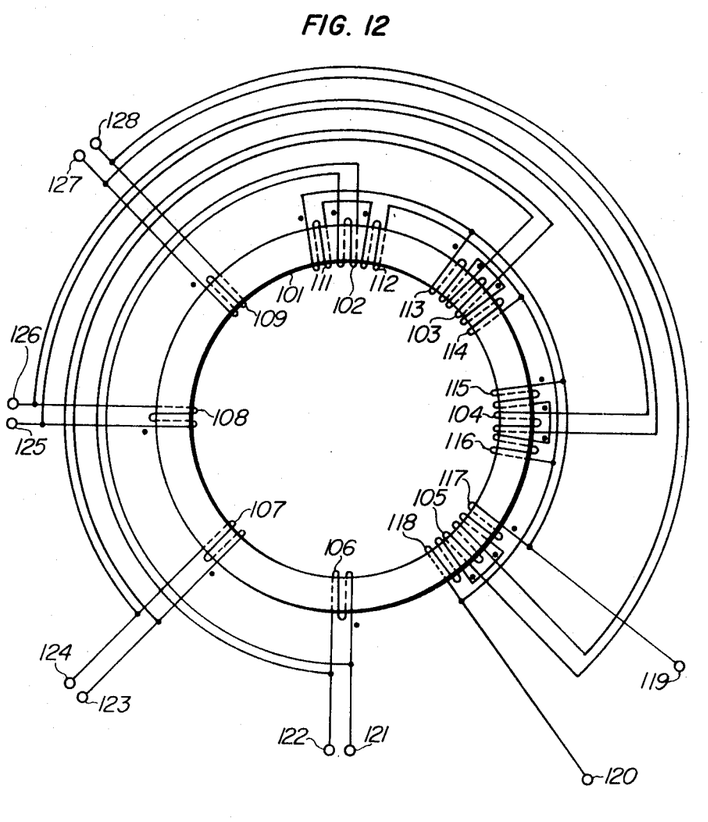
FIG. 12 is a schematic drawing showing an actual example of the construction of windings to be employed in realizing the present invention.

A schematic diagram showing the construction of a specific winding to be employed in embodying the present invention is illustrated in FIG. 12. The numeral 101 shows a ring iron core with a primary conductor (not shown) disposed in the center, the numerals 102, 103, 104 and 105 show the secondary windings for supplying a trigger signal, the numerals 105, 106, 107 and 108 show the same compensating windings as shown in FIGS. 10 and 11 and the numerals 111, 112, ......, 118 show compensating windings shown by, say, the numeral 142 in FIG. 2. In the arrangement exemplified in FIG. 12, the compensating windings are further divided to maintain closer electromagnetic coupling with the secondary windings and each disposed on both sides of each secondary winding in a series connection. The divided compensating windings each in a series connection are connected in parallel with one another across the terminals 119 and 120. The remaining compensating windings are connected in parallel with the secondary windings in the same way as in FIG. 10 and are further connected to terminals 121, 122, ....., 128 respectively. The embodiment shown in FIG. 12 is equipped with four secondary windings on a single iron core, which are accompanied by two kinds of compensating windings described respectively in FIGS. 2 and 10. In this case, generation of an erroneous trigger signal will be more effectively prevented if additional turns of compensating windings are attached to the compensating windings 106 to 109 in the same way as the compensating windings 111 to 118.

As can be seen from the above description, the generation of an erroneous trigger signal is prevented through the compensating windings according to the present invention. To increase the effect of the present invention, however, it is recommended to consider the following: In the embodiments shown in FIGS. 2 to 7, the currents flowing through the primary conductor portions 131 and 132 due to the stray capacity have to be of the same order of magnitude so as to obtain satisfactory effects from the compensating windings 142 and 152. If there is a difference between the two currents, a trigger signal proportional to such a difference comes to be produced as explained earlier. To prevent this, the primary conductor has to be constructed in such a manner that each of the two-way conductor portions has the same stray capacity at each point thereof as against the main circuit. For practical purposes, it is also desirable that such points of iron cores or compensating windings which are disposed opposite to each other on the two paths of the two-way conductor portions be at the same level of potential, thereby maintaining the same current, despite a variation in the voltage of the main circuit. This consideration is taken in FIG. 13 which shows an embodiment using iron cores in such an arrangement as shown in FIG. 12.

Considering the convenience in arranging the main circuit, a tray-like construction is generally employed to contain an appropriate number of series-connected controlled rectifiers and auxiliary circuits in a single tray, and a required number of iron cores are provided for each tray. With reference to the embodiment shown in FIG. 13, four controlled rectifiers constitute one set, two sets of controlled rectifiers being contained in one tray. The primary conductor portions 131 and 132 each equipped with four secondary windings as shown in FIG. 12 disposed on iron cores are provided for the respective sets of controlled rectifiers, said secondary windings supplying a trigger signal to the gate electrode of each controlled rectifier. The elements corresponding to those in FIG. 2 are provided with similar symbols, the suffixes $a$, $b$, $c$ and $d$ indicating the subdivision of such elements. The symbol $R_1$ shows a dividing resistor, and $R_2$ and $C_2$ a damping resistor and a capacitor respectively, which correspond to the impedance Z shown in FIG. 2. Resistors $R_3$ and $R_4$ and capacitor $C_2$ inserted between the secondary windings 141 and 151 and the rectifying circuits 16 and 17 attenuate, like the zener diodes 18 and 19, an erroneous trigger signal generated in the secondary windings. $AL_1$ and $AL_2$ are anode reactors which are connected in the main circuit for each set of series-connected controlled rectifiers to correct the imbalance in triggering among the controlled rectifiers.

Figure 13:
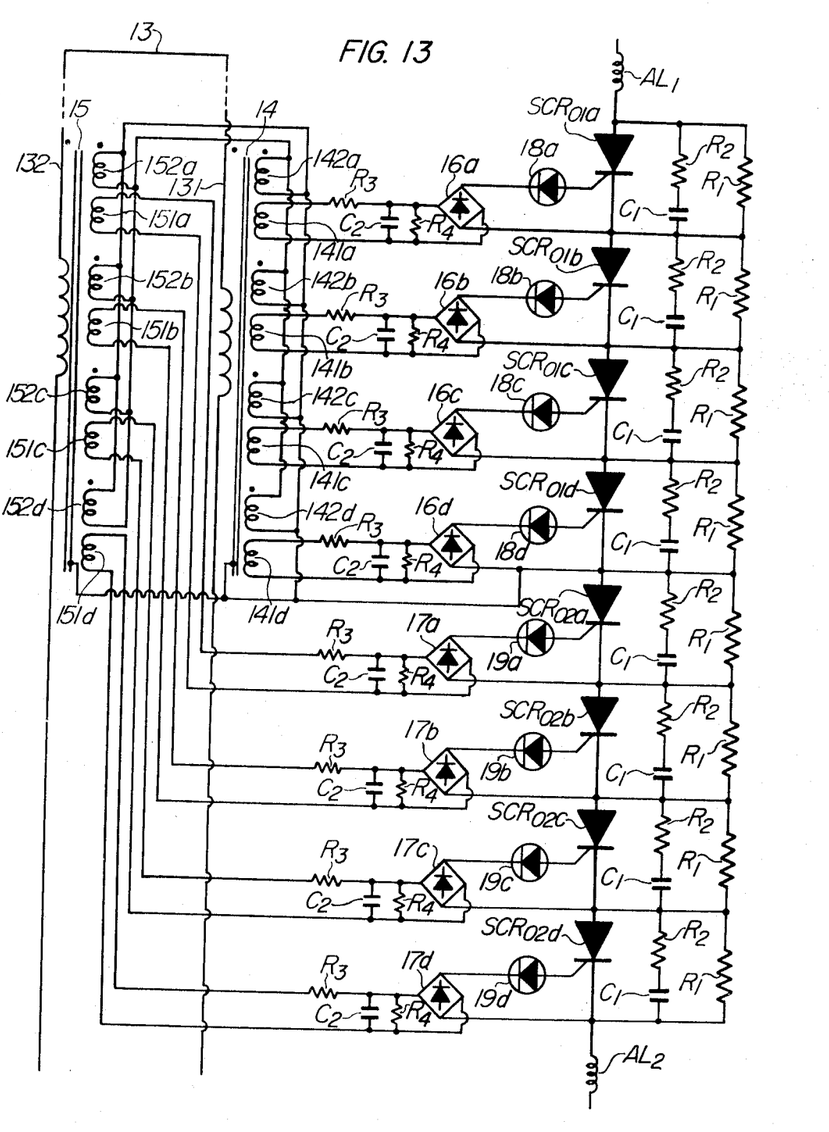
FIG. 13 shows a schematic diagram of a more specific embodiment of the present invention.

The junction point between the cathode of the controlled rectifier $SCR_{01d}$ and the anode of the controlled rectifier $SCR_{02a}$ is connected with the compensating windings 142 and 152 and further with the iron cores 14 and 15 to equalize the potential as mentioned earlier. The iron cores 14 and 15 are of course arranged in such positions as corresponding to the primary conductor portions 131 and 132.

It is also recommended that the manner of pairing iron cores with the controlled rectifiers should be improved to obtain more effective results. In such an arrangement as shown in FIG. 2 where the controlled rectifiers $SCR_{01}$ and $SCR_{02}$ are paired with the iron cores 14 and 15 respectively, $SCR_{03}$ should be paired with an iron core (not shown) to be located immediately below the iron core 15 and an iron core to be placed immediately below the iron core 14 should be paired with a controlled rectifier to be provided just next to $SCR_{03}$, thereby maintaining the stray capacity at individual points of the primary conductor uniform as against the corresponding points of the main circuit to further contribute to the elimination of an erroneous trigger signal.

To summarize the above description the present invention utilizes compensating windings to obtain a correct trigger signal by discriminating its cause from a cause of an erroneous trigger signal, with regard to the fact that the correct trigger signal acts on an iron core in a manner different from an erroneous trigger signal. Therefore, a device with controlled rectifiers connected in series can not only be operated to the fullest satisfaction, but its construction can be made rugged and highly reliable as the mere addition of compensating windings suffices.

It is intended that the present invention should be materialized in a variety of configurations and the embodiments shown in the accompanying drawings shall not be interpreted in a limiting sense.

What is claimed is:

1. A trigger circuit for controlled rectifiers comprising source means for generating a trigger signal-producing current; a primary conductor in the form of a two-way circuit coupled to said source means which passes said current supplied by said source means; and iron cores each provided with individual secondary windings each producing an independent voltage in the form of a trigger signal, said cores being threaded by said primary conductor and having compensating means including a pair of compensating windings for producing a voltage through said primary conductor which prevents an erroneous trigger signal from said secondary windings, said iron cores being respectively coupled to each side of said two-way circuit.

2. A trigger circuit for controlled rectifiers according to claim 1, in which said compensating windings are connected in series with opposite polarity in the case of a proper trigger signal but are effectively connected in series with the same polarity for said erroneous trigger signal, whereby said secondary windings are equivalently short-circuited in the case of an erroneous trigger signal.

3. A trigger circuit for controlled rectifiers according to claim 1, in which said compensating windings are utilized in such a manner that said secondary windings are equivalently opened through a cause of an erroneous trigger signal.

4. A trigger circuit for controlled rectifiers according to claim 1, in which said compensating windings disposed respectively at each way of said two-way circuit are connected with each other, in such a polar arrangement that the voltages across said compensating windings are added to each other when currents flow in the same direction through said primary conductor.

5. A trigger circuit for controlled rectifiers according to claim 1, in which one of said secondary windings on a first iron core disposed at one way of said two-way circuit constituting said primary conductor is connected in parallel with one of said compensating windings on a second iron core disposed at another way of said two-way circuit and the other of said secondary windings on the second iron core is connected in parallel with the other of said compensating windings disposed on the first iron core, in such a polar arrangement that voltages across each of said parallel connections are added to each other when currents flow in the same direction through said primary conductor.

6. A trigger circuit for controlled rectifiers according to claim 5, in which said secondary windings are disposed on iron cores different from those iron cores on which said compensating windings are disposed.

7. A trigger circuit for controlled rectifiers according to claim 1, in which one of said secondary windings on a first iron core disposed at one way of said two-way circuit constituting said primary conductor is connected in series with one of said compensating windings on a second iron core disposed at another way of said two-way circuit and the other of said secondary windings on the second iron core is connected in series with the other of said compensating windings disposed on the first iron core, in such a polar arrangement that voltages across each of said series connections offset each other when currents flow in the same direction through said primary conductor.

8. A trigger circuit for controlled rectifiers according to claim 7, in which said secondary windings are disposed on iron cores different from those iron cores on which said compensating windings are disposed.

9. A trigger circuit for controlled rectifiers according to claim 1, in which a shielding material for electrostatistically shielding said primary conductor from a main circuit is added to said primary conductor, said shielding material being maintained at the same potential as said current source means and a part of said main circuit.

10. A trigger circuit for controlled rectifiers according to claim 1, in which a plurality of sets of said secondary windings and compensating windings are disposed on the same iron core, a plurality of sets of said compensating windings being connected in parallel with one another in the same polarities.

11. A trigger circuit for controlled rectifiers according to claim 1, in which said iron cores and said compensating windings thereon placed at one way of the two-way circuit of said primary conductor have the same potential as the corresponding iron cores and compensating windings placed at another way of said two-way circuit, all of said iron cores and compensating windings being connected to a part of the main circuit of the controlled rectifiers.

12. A trigger circuit for controlled rectifiers according to claim 1, in which said iron cores disposed at said positions of said primary conductor are used in combination with controlled rectifiers in such a manner that stray capacity has a uniform effect on said primary conductor.

13. A trigger circuit for controlled rectifiers according to claim 1, in which said secondary windings are wound on iron cores different from the ones on which said compensating windings are wound.

14. A trigger circuit for controlled rectifiers according to claim 13, in which said compensating windings respectively disposed at each way of said two-way circuit are connected with each other in such a polar arrangement that voltages across said compensating windings offset each other when currents flow in the same direction through said primary conductor.

15. A trigger circuit for controlled rectifiers comprising a source means for generating a trigger signal-producing current; a primary conductor for passing a current due to said source means; an iron core on which are disposed a secondary winding to produce a voltage, which is a trigger signal, due to said current passing said primary conductor; and a compensating winding disposed on such a portion of said iron core that is just opposite to said secondary winding with respect to said primary conductor.

16. A trigger circuit for controlled rectifiers according to claim 15, in which said secondary winding and compensating winding are connected in parallel with each other in such a polar arrangement that voltages across said respective windings due to said current flowing through said primary conductor are offset by each other.

17. A trigger circuit for controlled rectifiers according to claim 15, in which said secondary winding is connected in series with said compensating winding in such a polar arrangement that voltages across said respective windings due to said current flowing through said primary conductor are added to each other.

* * * * *